(12) United States Patent
Chud

(10) Patent No.: US 11,790,405 B1
(45) Date of Patent: Oct. 17, 2023

(54) SELF-OPTIMIZING SYSTEM FOR PROGRAMMATIC ADVERTISING

(71) Applicant: Amazon Technologies, Inc., Seattle, WA (US)

(72) Inventor: Andrew Christopher Chud, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/116,766

(22) Filed: Dec. 9, 2020

(51) Int. Cl.
*G06Q 30/02* (2023.01)
*G06Q 30/0272* (2023.01)
*G06Q 30/0273* (2023.01)

(52) U.S. Cl.
CPC ..... *G06Q 30/0272* (2013.01); *G06Q 30/0275* (2013.01)

(58) Field of Classification Search
CPC ................................. G06Q 30/02; G06Q 40/04
See application file for complete search history.

(56) References Cited

U.S. PATENT DOCUMENTS

| | | | |
|---|---|---|---|
| 2004/0103024 A1* | 5/2004 | Patel ................ | G06Q 30/0247 705/14.53 |
| 2008/0052219 A1* | 2/2008 | Sandholm ............ | G06Q 40/04 705/37 |
| 2008/0071594 A1* | 3/2008 | Morin .................. | G06Q 30/08 705/37 |
| 2010/0138452 A1* | 6/2010 | Henkin ................ | G06Q 30/02 707/803 |
| 2010/0198694 A1* | 8/2010 | Muthukrishnan ...... | G06Q 30/02 705/14.71 |

\* cited by examiner

*Primary Examiner* — Saba Dagnew
(74) *Attorney, Agent, or Firm* — Eversheds Sutherland (US) LLP

(57) ABSTRACT

Systems, methods, and computer-readable media are disclosed for optimizing a programmatic advertising system by continuously adjusting certain policies with respect to the advertising bids to manage and balance commitments made to publishers and/or advertisers. The policies may be modified to adjust an attach rate and/or a guaranteed bid rate to balance various type of advertising bids (e.g., open auction, private market place deals, preferred deals, etc.) and ensure that commitments publishers and/or advertisers are satisfied. The system may continuously track new bids and may adjust the policies in real time or near real time to achieve certain targets for submissions, impressions, and other well-known advertising metrics.

20 Claims, 7 Drawing Sheets

SELF-OPTIMIZING SYSTEM FOR PROGRAMMATIC ADVERTISING

BACKGROUND

Programmatic advertising is one way in which digital advertising is traded. The process involves two players, an advertiser that is interested in buying placements for an advertisement and a publisher that owns or controls an ad placement opportunity (e.g., an advertisement during a television or streaming show or movie). Programmatic advertising allows ad placement opportunities to be sold via a real-time or near real-time exchange based on minimum pricing thresholds and prearranged agreements. For each advertising slot, a publisher will send information (e.g., via an ad exchange) about an available ad placement opportunity and advertisers may bid (e.g., via the ad exchange) to buy placements for an advertisement. The publisher's ad server will select a winning bid corresponding to an advertisement for the ad placement opportunity. There are various advertising bid types including open auction (OA), also known as open marketplaces, private marketplace deals (PMP), programmatic direct, and preferred deals, for example. An advertisement exchange system may manage arrangements with advertisers and/or publishers (e.g., minimum number of impressions, minimum number of advertisement bid submissions, etc.). However, with the high volume of bids and auctions occurring and the real-time or near-real time nature of programmatic advertising, it may be difficult to select the appropriate advertisements to satisfy and balance the arrangements made with publishers and advertisers.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

The systems and methods herein may be used by an advertisement exchange system to assign advertisements to certain advertisement slots, receive tracking events (e.g., media tracking pixels for start, impression, first quartile, midpoint, third quartile, complete, etc.) and modify a commitment policy using an adjustor of the advertisement exchange system. A commitment policy may be settings based on pacing toward goals associated with a contractual or other commitments with publishers, where settings may be deal attachment rate, guaranteed line item use, or any other parameters that affect how the bids are treated in the demand side platform or ad server.

The advertisement exchange system may interface with advertisers and/or publishers and may manage certain contractual agreements with advertisers and/or publishers. For example, the contractual agreements may specify that each advertisement bid request be filled with a certain percentage of type of advertisement bid. In another example, a contractual agreement may specify that OA opportunities must be filled at a specific rate (e.g., 30 percent). In yet another example, a contract arrangement may require that a certain amount or percentage of open auction bids be "guaranteed."

The advertisement exchange system may keep track of the bids submitted, including the advertisement bid type, and may compare the submitted bids to the commitments set forth in each contractual arrangement. To ensure the commitments in the contractual arrangements are met, the adjustor may determine whether or not to make deals eligible to serve each slot opportunity (e.g., by attaching respective deal IDs or not). The system may further assign to OA bids key/value pairs that correspond to "guaranteed" line items in the ad server. The advertisement exchange system may also receive auction results for the advertisement bids submitted. The adjustor may periodically compare submitted bids and bit results to the commitments to make adjustments in real-time or near real-time to the commitment policies.

Figure 1:
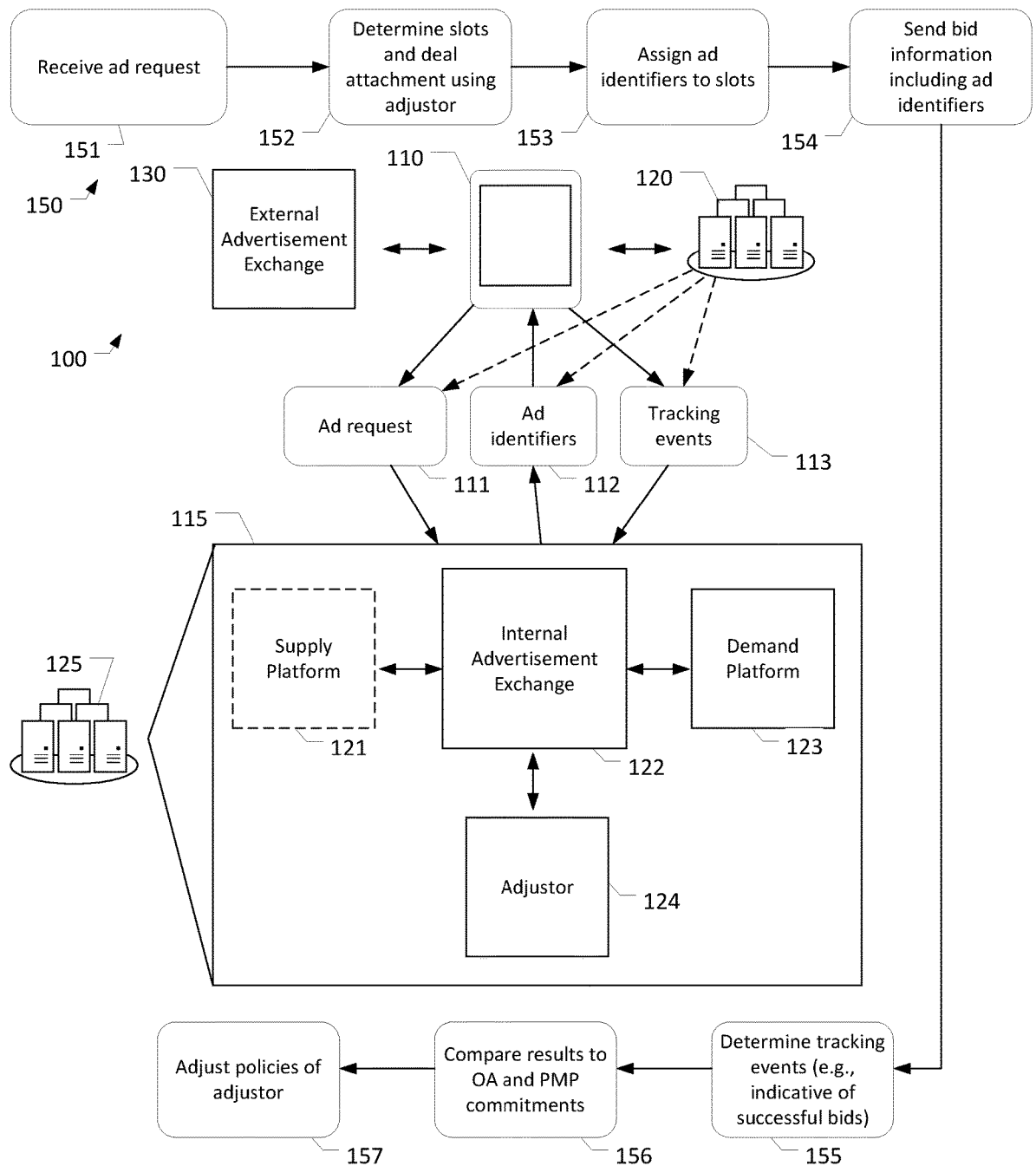
FIG. 1 is a schematic illustration of an example use case showing an advertising exchange system, electronic device and an external advertisement exchange in accordance with one or more example embodiments of the present disclosure.

Referring to FIG. 1, an example use case 100 for determining an advertisement bid request, determining advertisement bids for submission using an adjustor that consults with advertiser commitments, and modifying the commitment policies to satisfy the commitments based on the submitted advertisement bids and tracking events is illustrated. In the illustrated example, electronic device 110 may communicate (e.g., over the Internet) with a server 120 running media content service (e.g., a media content streaming service for playing movies, television, video content, music content, and the like) as well as the advertisement exchange system 115 running on server 125. It is understood that server 120 and server 125 may be different servers and each may be one or more servers. Alternatively, server 120 and server 125 may be the same server. Electronic device 110 may further communicate over the Internet with an external advertisement exchange 130 which may be or include a supply side platform that interfaces with publishers, sends advertisement bid requests, and/or distributes tracking events. The external advertising exchange may run on a server that may be similar to server 120 and/or 125.

The electronic device 110 may be any computing device that may communicate with one or more servers and/or other computing devices via any well-known wired or wireless system (e.g., Wi-Fi, cellular network, Bluetooth, Bluetooth Low Energy (BLE), near field communication protocol, etc.). The electronic device 110 may be any computing device with a processor and may include one or more displays (e.g., touch screen display) and/or one or more speakers. In the example illustrated in FIG. 1, electronic device 110 is a smart phone or tablet device comprising a processor, a display and a speaker, however it is understood that computing device may be a desktop computer, laptop computer, e-reader, wearable device, smart speaker, or the like. Computing device 110 may run a local application (e.g., media streaming application) to facilitate communication with the server running the advertisement exchange system, external advertisement exchange and/or streaming application and otherwise process instructions and/or perform operations based on commands received from the server or servers.

Server 125 may be one or more computing devices (e.g., one or more servers) in communication with the electronic device 110. For example, server 120 may be the same as server 600 described in more detail below with respect to FIG. 6. Server 125 may include one or more servers and/or otherwise communicate with other servers, databases, datastores, and the like. The server may be a computing device with a processor and may run one or more applications and/or platforms (e.g., advertisement exchange system 115) in communication with the local application running on electronic device 110. It is understood that, in one example, the electronic device 110 and the server may coordinate to perform one or more of the operations described herein with respect to FIG. 1 or otherwise described herein. It is further understood that while exemplary use case involves advertisement exchange system 115 communicating with external advertisement exchange 130 via electronic device 110, one or more communications (e.g., ad request 111, ad identifiers 112, and/or tracking events 113) may be directly between external advertisement exchange 130 and advertisement exchange system 115.

As shown in FIG. 1, advertisement exchange system 115 may include internal advertisement exchange 122, demand platform 123, adjustor 124 and/or supply platform 121. Internal advertisement exchange 122 may oversee the implantation of advertisement exchange system 115 and communications with electronic device 110 and/or external advertisement exchange 130. Optionally, supply platform 121 may interface with publishers and/or external advertisement exchange 130 and implement supply side tasks and operations. Demand platform 123 may interface with advertisers and may be responsible for managing media content related to advertisements. The components of the advertisement exchange system 115 are described in more detail below with respect to FIG. 2.

The electronic device 110, may connect to the Internet (e.g., WiFi or cellular) and may be used to stream and display media content from server 120 which may run a media content streaming service. The streaming service may inform a local streaming application running on the electronic device of an upcoming commercial break and may send the electronic device 110 an advertisement request (e.g., bid request). The advertising request (e.g., ad request 111) may include bid requests and/or opportunities, standard commercial break information (e.g., commercial break patterns, timing information, formatting information), contextual information about the content corresponding to the bid opportunity (e.g., information about the type or genre of movie, show, music, and information about the application and/or device initiating the advertisement request, program or media information including genre and/or rating), requirements for the type of advertisement, demographics corresponding to the user of the electronic device, selected demographic and/or attribute segments that must match advertisement bids, and the like.

To initiate the actions of selecting the advertisements to submit for each bid opportunity, an example process flow 150 is presented and may be performed, for example, by one or more modules of a server 125 (e.g., running advertisement exchange system 115). The server 125 may include at least one memory that stores computer-executable instructions and at least one processor configured to access the at least one memory and execute the computer-executable instructions to perform various actions or operations, such as one or more of the operations in the process flow 150 of FIG. 1. It is understood that, in one example, electronic device 110 and the server may coordinate to perform one or more of the operations described herein with respect to FIG. 1.

At block 151, server 125 running advertisement exchange system 115 may receive the advertisement request from electronic device 110. Alternatively, this request may come from the server side (e.g., server 120). For example the advertisement request 111 may include the bid opportunities, standard commercial break information (e.g., timing information, formatting information), contextual information about the content corresponding to the bid opportunity (e.g., information about the type or genre of movie, show, music, etc.), requirements for the type of advertisement, demographics corresponding to the user of the electronic device, selected demographic and/or attribute segments that must match advertisement bids, and the like. The internal advertisement exchange 122 may process the advertisement request 111 and/or may parse out information in the advertisement request 111 (e.g., contextual information).

At block 152, server 125 running advertisement exchange system 115 may process the advertisement request 111 and determine information provided in that request (e.g., standard commercial break information, contextual information, demographic information, geographic information, etc.). Using the information in advertisement request 111, advertisement exchange system 115 may determine the number of advertising slot opportunities corresponding to advertisement request 111. Further, internal advertisement exchange 122 in communication with adjustor 124 may determine the slots that are designated for a deal bid (e.g., slots corresponding to deal IDs). This information may be included in the advertisement request 111. Using adjustor 124, advertisement exchange system 115 may determine which of the slots designated for deal bids will be attached to a deal ID. To make this determination, adjustor may consult with a commitment policy based on commitments made to publishers. For example, adjustor 124 may determine that 50% of the slots designated for deal bids will be filled with or otherwise assigned deal bids. The other slots may be used for other types of bids (e.g., OA).

At block 153, server 125 running advertisement exchange system 115 may assign certain advertisements to the slots corresponding to advertisement request 111. For example, demand platform 123 may maintain a database and/or library of advertisements that each are associated with certain attributes (e.g., context attributes, demographic attributes) and/or may correspond to a specific bid type (OA, deal, etc.). Based on the attributes and bid types of the advertisements, the internal advertisement exchange 122 may assign certain advertisements corresponding to advertisement identifiers to each slot based on the advertisements satisfying the requirements for each slot. Information about advertisements and/or advertisement campaigns may also be considered such as run dates, impression goals, and the like. It is understood that information about a user of electronic device 110 may further be determined. The user information may include behavioral information about the user such as shopping history, browser history, entertainment preferences and the like. This information may further be used to determine advertisements for each slot.

At block 154, server 125 running advertisement exchange system 115 may send bid information including the ad identifiers 112 (e.g., bid identifiers and/or key/value pairs) to electronic device 110. Electronic device 110 may then send the ad identifiers 112 to external advertisement exchange 130 for submission in the auction for the bid opportunities. Advertisement identifiers may include key/value pairs. It is understood that advertisement identifiers 112 may be sent to the device that sent the advertisement request 111. For example, advertisement identifiers 112 may be sent to electronic device 110 or server 120.

At block 155, server 125 running advertisement exchange system 115 may determine tracking events 113. For example, tracking events 113 may be received from electronic device 110 or server 120. The tracking events may indicate that an advertisement won the auction and was displayed. In one example, internal advertisement exchange 122 may process the tracking events 113. At block 156, server 125 running advertisement exchange system 115 may compare the tracking events 113 to commitments to advertisers and/or publishers. At block 157, server 125 running advertisement exchange system 115 may compare commitments to publishers to the bid submissions, and optionally tracking events, to adjust policies of adjustor 124 (e.g., commitment policies). For example, internal advertisement exchange 122 may determine that the OA bids for a certain advertiser are below a certain amount of submissions, and may determine to increase the number of OA submissions for this advertiser.

Illustrative Process and Use Cases

Figure 2:
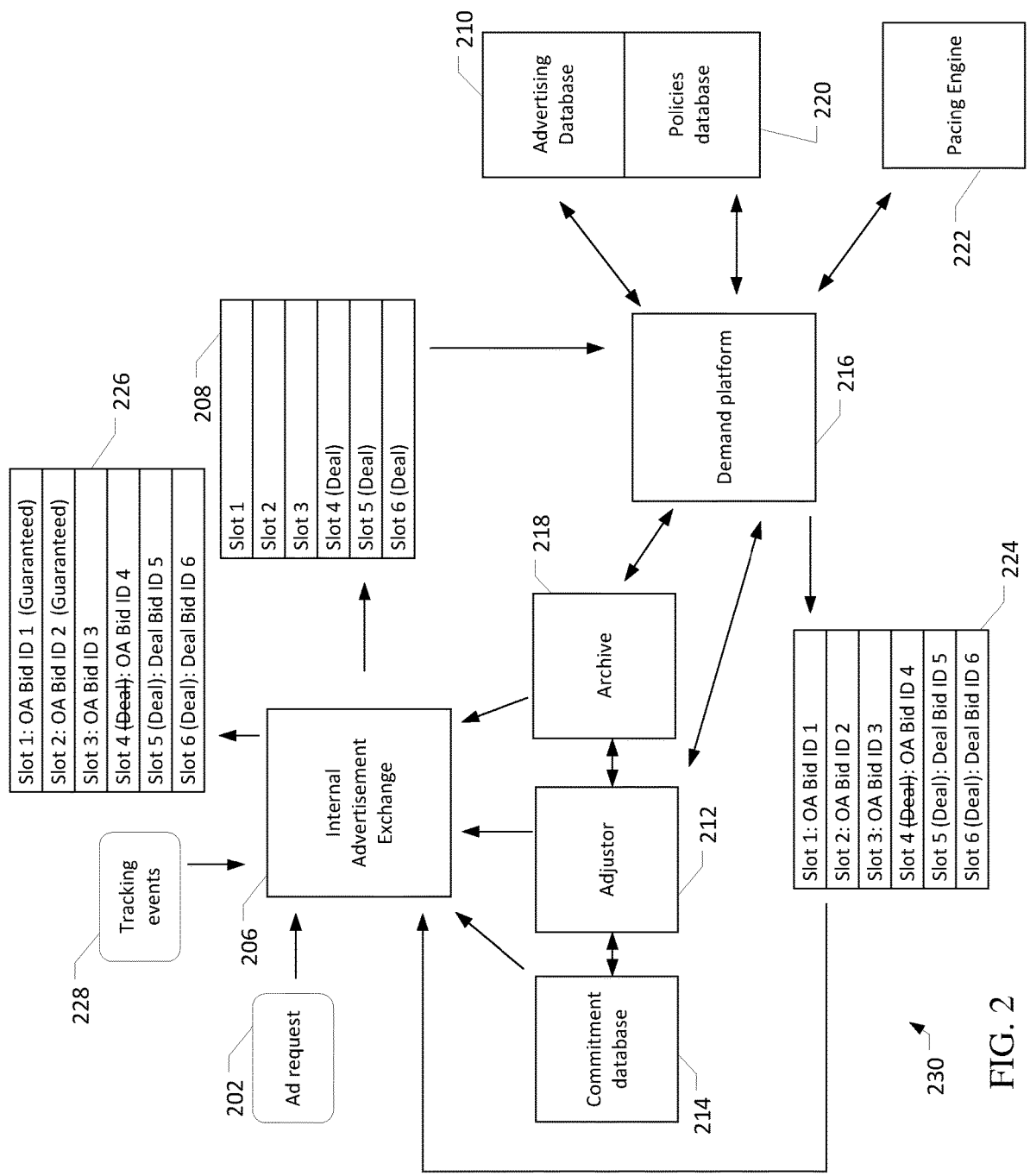
FIG. 2 is a schematic illustration of an example use case for an advertising exchange system, in accordance with one or more example embodiments of the present disclosure.

FIG. 2 is a schematic illustration of an example use case for determining opportunities and employing an adjustor to achieve goals and/or targets in contractual arrangements with publishers. The process illustrated in FIG. 2 may be performed by advertisement exchange system 230, which may be the same advertisement exchange system 115. For example, advertisement exchange system 230 may include internal advertisement exchange 206, which may be the same as internal advertisement exchange 122, adjustor 212 which may be the same as adjustor 124, and demand platform 216 which may be the same as demand platform 216. The advertisement exchange system 230 may further include commitment database 214, advertising database 210, archive 218, policies database 220, and pacing engine 222, which may be standalone components of advertisement exchange system 230 or may be subcomponents of internal advertisement exchange 206, demand platform 216, and/or adjustor 212.

As shown in FIG. 2, internal advertisement exchange 206 may receive advertisement request 202. For example, advertisement request 202 may come from electronic device 110 or the server side. Advertisement request 202 may be the same as advertisement request 111. Internal advertisement exchange 206 may parse advertisement request 202 to determine a number of slots corresponding to the advertisement request 202. For example, internal advertisement exchange 206 may analyze information sent with or in the advertisement request 202 to determine standard commercial break information (e.g., commercial break pattern), timing information and/or formatting information. In the example shown in FIG. 2, internal advertisement exchange 206 may determine slots 208 which includes six unique bid opportunities and may further determine a time associated with each slot (e.g., 30 seconds, 60 seconds, 120 seconds, etc.). However, it is understood that any number of slots may be determined. Based on advertisement request 202, internal advertisement exchange 206 may further determine one or more slots designated for deal bids. As shown in FIG. 2, slots 4, slot 5, and slot 6 may be designated for deal bids. This determination may be based on the advertisement request.

Once internal advertisement exchange 206 determines the number of slots for the advertisement requests 202, internal advertisement exchange 206 may determine how many slots are designated for deal bids. Information about the slots and slots designated for deal bids may be communicated to demand platform 216.

While a slot may be designated for a deal bid, the demand platform 216 may determine to disregard this designation and submit a non-deal bid (e.g., an OA bid). For example, the demand platform may communicate with adjustor 212 to make this determination. Adjustor 212 may be in communication with commitment database 214 which may maintain a library and/or database of commitments to publishers. The commitments may include a total number of impressions per period of time or opportunity, a total number of submissions per period of time or opportunities, a number of successful bids, and/or any well-known metric for tracking bids and/or ensuring that opportunities are filled at the specific rate. It is understood that the commitments may be specific to a set of contextual signals (e.g., channel, subject matter, device type, etc.). The adjustor may further be in communication with archive 218 which may keep a history of the advertisements that have been submitted to certain publishers. Archive 218 may further communicate with pacing engine 222.

Using the information from the commitment database 214 and archive 218, adjustor may determine whether the advertising exchange system is on track to achieve the goals set forth in the commitment database 214. For example, adjustor may determine for a certain publisher if an advertisement bid type has been filled at the agreed rate in the contractual agreement with the publisher, e.g., 30% of total impressions. If the system is not on track, the adjustor 212 may adjust commitment policies for assigning deal bids to slots designated for deals. For example, the adjustor may increase or decrease a number or percentage of a number of slots that will be assigned deal identifiers (e.g., the attach rate). For example, the attach rate may be a percentage of slots in each ad request that have one or more deal identifiers attached to them (e.g., after already matching the request against deal contextual/behavioral targeting rules), thus making those slots eligible to be served by deal line items in the demand-side platform.

Demand platform 216 may rank bids for each slot. To determine which advertisements to submit for each slot, the demand side platform may communicate with an advertising database 210 which may maintain a database or library of available advertisements to select from. The database or library may associate each advertisement with characteristics or attributes such as time, content type, format, and/or key demographics, and/or any other well-known characteristics or attributes. Rules included in the advertisement request 202 may also be communicated to demand platform 216 and may be used to make this determination. The demand platform 216, may determine advertisements and/or campaigns based on a number of criteria, including pacing towards goals with advertisers and/or budgets and may further consult certain priority settings and/or other settings (e.g., matched targeting settings) to rank bids and ultimately determine which bid to assign to each slot. For example, certain rules about the types of advertisements that may be submitted or required attributes (e.g., relevant demographics, content type, etc.) may also be communicated to the demand platform 216.

Policies database 220 may be part of advertising database 210 or may be a standalone database. Policies database 220 may maintain certain rules or policies for each advertisement. Policies database 220 may associate an advertisement bid type (e.g., OA, PMP, preferred deal) to each advertisement and may further include other rules such as rules about the types of media content for which the advertisement in question may be paired with. Additionally, the policies database 220 may include rules about the types of advertisements that may appear in the same advertisement opportunity and/or advertisement break (e.g., in slots 208). For example, an advertisement for soda may include a rule that no other soda advertisement may be included in the same commercial break.

To select the most appropriate advertisement for each slot, demand platform will communicate with pacing engine 222 which may keep track of commitments with advertisers (e.g., pacing and/or budget commitments). For example, advertisement commitments may include minimum number of impressions, minimum number of percentage of bid submissions, minimum number of successful bids, and/or any other well-known advertising metric. If there are multiple advertisement candidates that satisfy the requirements for each slot, the demand platform may select the candidate that best satisfies the goals according to the pacing engine 222.

In one example, the demand platform may rank the available candidates (e.g., based on information from the pacing engine). Upon determining the best advertising candidates for each slot, the demand platform may communicate slots 224 to the internal advertisement exchange 206 and may include a bid identifier for each slot in slots 208. Each bid identifier may include a unique identifier that corresponds to an advertisement in advertising database 210 and/or may correspond to a key/value pair. In another example, multiple available candidates may be submitted for one or more slots.

The internal advertisement exchange may also prioritize an OA advertisement type bid with a key/value pair that matches against line items at a third party ad server. For example, the prioritized bid may cause such open auction bids to serve at higher priority in the advertisement server. In one example, a prioritized OA bid may be returned to the client with an advertisement identification (e.g., key/value pairs) that matches that bid to "guaranteed" line items in the ad server. The determination of which bids to prioritize may occur when slots 208 are determined or may alternatively occur after determining slots 224. The determination of which bids should be matched to "guaranteed" line items may be made by adjustor 212 based on commitments in commitments database 214. For example, if the adjustor determines that not enough OA bids are successful or that deal bids are negatively impacting the OA bids, the adjustor may increase the number of "guaranteed" bids. The internal advertisement exchange may then submit slots 226 including the bid identifiers and the key/value pairs required to match OA bids to "guaranteed" line items, if any.

Advertisement exchange system 230 may further receive tracking events 228 that inform the advertisement exchange system 230 of whether the bids were successful. Archive 218 may save this information and this information may be used by adjustor 212 to modify commitment policies. This information may further be used by demand platform 216 to update pacing engine.

Figure 3:
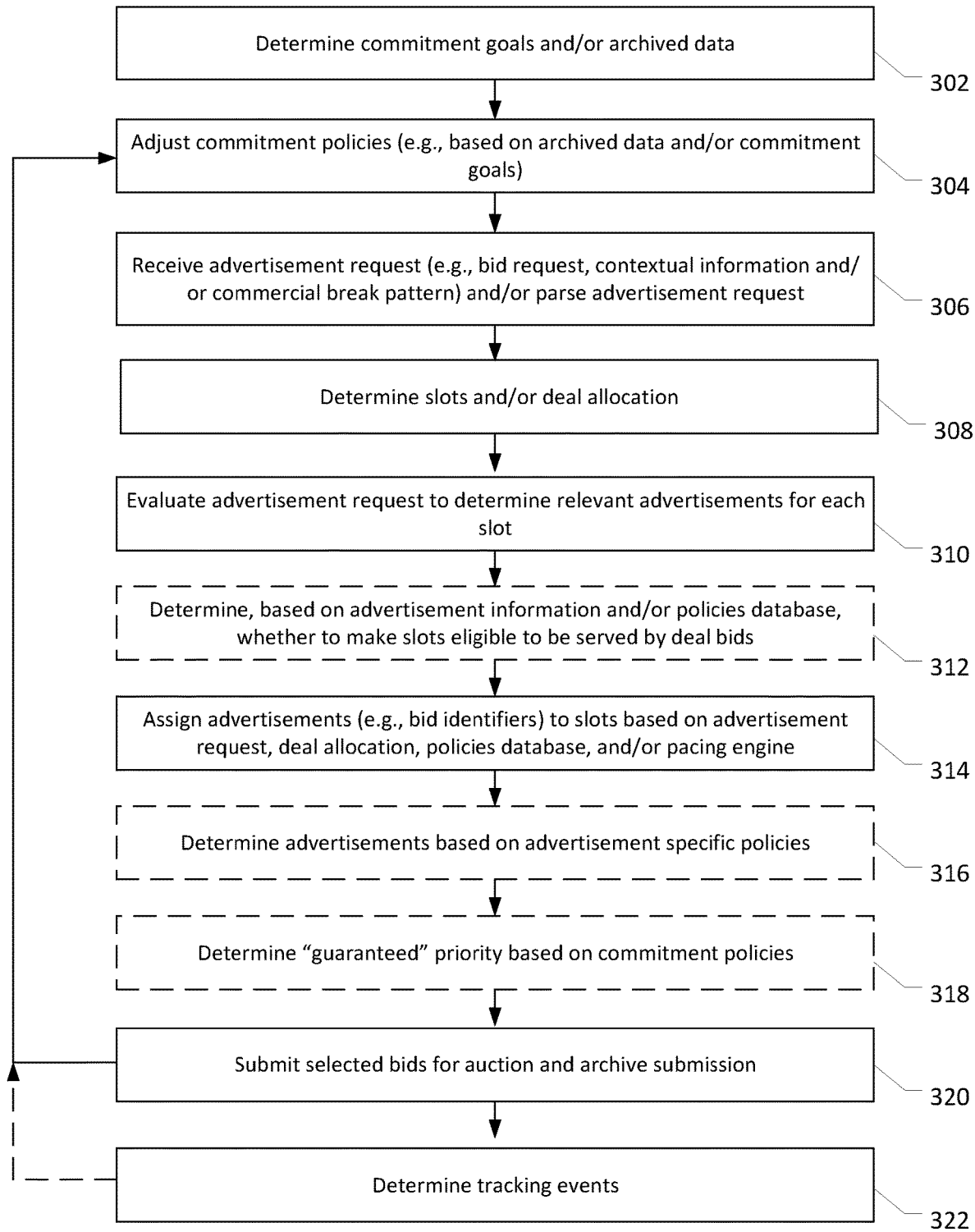
FIG. 3 is a schematic illustration of an example process flow for determining and submitting advertisement bids, in accordance with one or more example embodiments of the present disclosure.

FIG. 3 depicts example process flow for determining slots corresponding to an advertisement request and determining advertisements to submit for each slot based on certain contractual commitments to publishers and advertisers. Some or all of the blocks of the process flow in this disclosure may be performed in a distributed manner across any number of devices (e.g., servers and computing devices). Some or all of the operations of the process flow may be optional and may be performed in a different order.

At block 302, computer-executable instructions stored on a memory of a device, such as a server, may be executed to determine commitment goals and/or archived submission data corresponding to advertisements submitted for auction in response to an advertisement request. The commitment goals may be a library and/or database of commitments to publishers. The commitments may include a total number of impressions per period of time or opportunity, a total number of submissions per period of time or opportunities, a number of successful bids, and/or any well-known metric for tracking advertisement bids and/or ensuring that opportunities are filled at the specific rate. As explained above, the commitments may be specific to a certain publisher and/or set of contextual signals in the advertisement request (e.g., channel, subject matter, device type, etc.).

At block 304, computer-executable instructions stored on a memory of a device, such as a server, may be executed to adjust commitment policies based on the archived data and/or commitment goals in the commitment database. For example, an adjustor may determine a certain target or goal for number of submissions or impressions for a type of advertisement bid (e.g., OA, PMP) and may determine how to allocate deal bids to available slots designated for deal bids based on this information. Additionally, the adjustor may also consider the archived data to determine past advertisement submissions and may compare these past submissions to the commitment database to determine if the submissions are satisfying the commitments in the commitment database. As explained above, the commitments may be publisher specific and may be specific to a set of contextual signals (e.g., channel, subject matter, device type, etc.).

In one example, if the commitment database indicates a commitment to a certain amount of OA impressions and based on the archived data, advertisement exchange system is underperforming, the adjustor may increase the percentage of slots designated for deal bids that will be assigned deal bids. Additionally, or alternatively, if the commitment goals include a commitment for a number of impressions and the archived data indicates that the advertisement exchange system is under performing, the advertisement exchange system may prioritize OA bids by matching them to "guaranteed" line items.

At block 306, computer-executable instructions stored on a memory of a device, such as a server, may be executed to receive an advertisement request and/or parse the advertisement request. For example, an advertisement request may include a bid request for advertisements, standard commercial break pattern information, certain rules and/or policies with respect to the acceptable advertisements (e.g., demographics, group or category type, certain attributes) contextual information about the media content for which the advertisements will be paired, information about the user (e.g., demographics), and/or information about the electronic device, as well as any other well-known information that accompanies an advertisement request.

At block 308, computer-executable instructions stored on a memory of a device, such as a server, may be executed to determine a number of slots corresponding to the advertisement request. For example, the advertisement exchange system may use information in the advertisement request (e.g., commercial break pattern) to determine a number of slots and timing and formatting for each slot. The advertisement exchange system may further determine the one or more slots that are designated for deal bids based on the advertisement request. A slot designated for deal bids may serve deal bids or any other bid type. Only slots designated for deal bids may serve deal bids. The advertisement exchange system may determine what percentage or how many of the slots designated for deal bids will be assigned deal bids (e.g., attach rate or attachment rate). This determination may be made based on the commitment policies. Optionally, the advertisement exchange system may determine to prioritize certain OA bids to match such bids to a "guaranteed" line item. Alternatively, this prioritization may be done at step 318.

At block 310, computer-executable instructions stored on a memory of a device, such as a server, may be executed to evaluate the advertisement request to determine relevant advertisement candidates for each bid. This process may involve determining the advertisement bid type for each slot (e.g., OA, PMP, etc.) and determining any policies or rules for the advertisements in the advertisement information (e.g., attribute or category requirements, demographic requirements, etc.). Once these rules and policies are determined, advertisements in a library or database of advertisements matching these rules and policies and matching the advertisement bid type may be identified.

At optional block 312, computer-executable instructions stored on a memory of a device, such as a server, may be executed to determine whether to adjust the attach rate or otherwise make slots eligible to be served by deal bids (e.g., by attaching a deal ID to the slot). At block 314, computer-executable instructions stored on a memory of a device, such as a server, may be executed to assign advertisements (e.g., bid identifiers) to each slot. For example, an evaluation may be performed of the advertisement request against the line items for active campaigns. As explained above, the advertisement candidates that satisfy the requirements in the advertisement request, the advertisement bid type requirements, and/or the requirements in the policies database may be identified. The pacing engine and the archived data may then be consolidated to rank the qualifying candidates based on commitments made to advertisers. For example, if a commitment for a number of impressions has been made with an advertiser and the archived data indicates that the advertisement exchange system is underperforming with respect to the impressions, that advertisement may be prioritized over other qualified advertisements.

Each advertisement may further include certain rules and policies unique to that advertisement. For example, an advertisement may include a policy that requires that no other advertisements during the commercial break are of the same type (e.g., product type). In one example, an advertisement for soda may include a policy that requires that no other advertisements for soda are included in the commercial break.

It is understood that an advertisement specific policy may disqualify other advertisements assigned to slots for the same commercial break. At optional block 316, computer-executable instructions stored on a memory of a device, such as a server, may be executed to determine advertisements based on specific policies for advertisements that have been assigned to a slot. If there is a conflict with an advertisement specific policy, the advertisement with a higher priority (e.g., based on advertiser commitments) may be selected.

At optional block 318, computer-executable instructions stored on a memory of a device, such as a server, may be executed to determine which, if any, selected advertisements should be prioritized to match such bid to a "guaranteed" line item, giving the advertisement a heightened chance of winning the auction for that respective slot. This determination may be made based on information from the pacing engine. For example, the pacing engine may determine that an advertisement exchange system is underperforming with respect to commitment to an advertiser and thus may submit advertisements for that advertiser as "guaranteed." Alternatively, or in addition, the determination of whether to assign a key/value pair corresponding to a "guaranteed" line item to an OA bid may be made based on commitments to publishers.

At block 320, computer-executable instructions stored on a memory of a device, such as a server, may be executed to submit an advertisement bid for each time slot, the advertisement. This information may be sent to the electronic device and may be sent from the electronic device to the external advertisement exchange that sent the ad request. Alternatively, the advertisement exchange system may send this information directly to the external advertisement exchange. The information related to the submission may be archived. At this point, block 304 may be reinitiated to adjust the commitment policies based on the archived data.

At block 322, computer-executable instructions stored on a memory of a device, such as a server, may be executed to determine tracking events. The tracking events may come from the electronic device or from the server side (e.g., ad stitcher). The tracking events may include the results of the auction and indicate which advertisements were selected for publication. The tracking events may be archived and may be shared with the pacing engine. At this point, tracking events may be shared with the adjustor and block 304 may optionally be initiated to update the commitment policies to the extent commitments with publishers are dependent on the tracking events.

Figure 4:
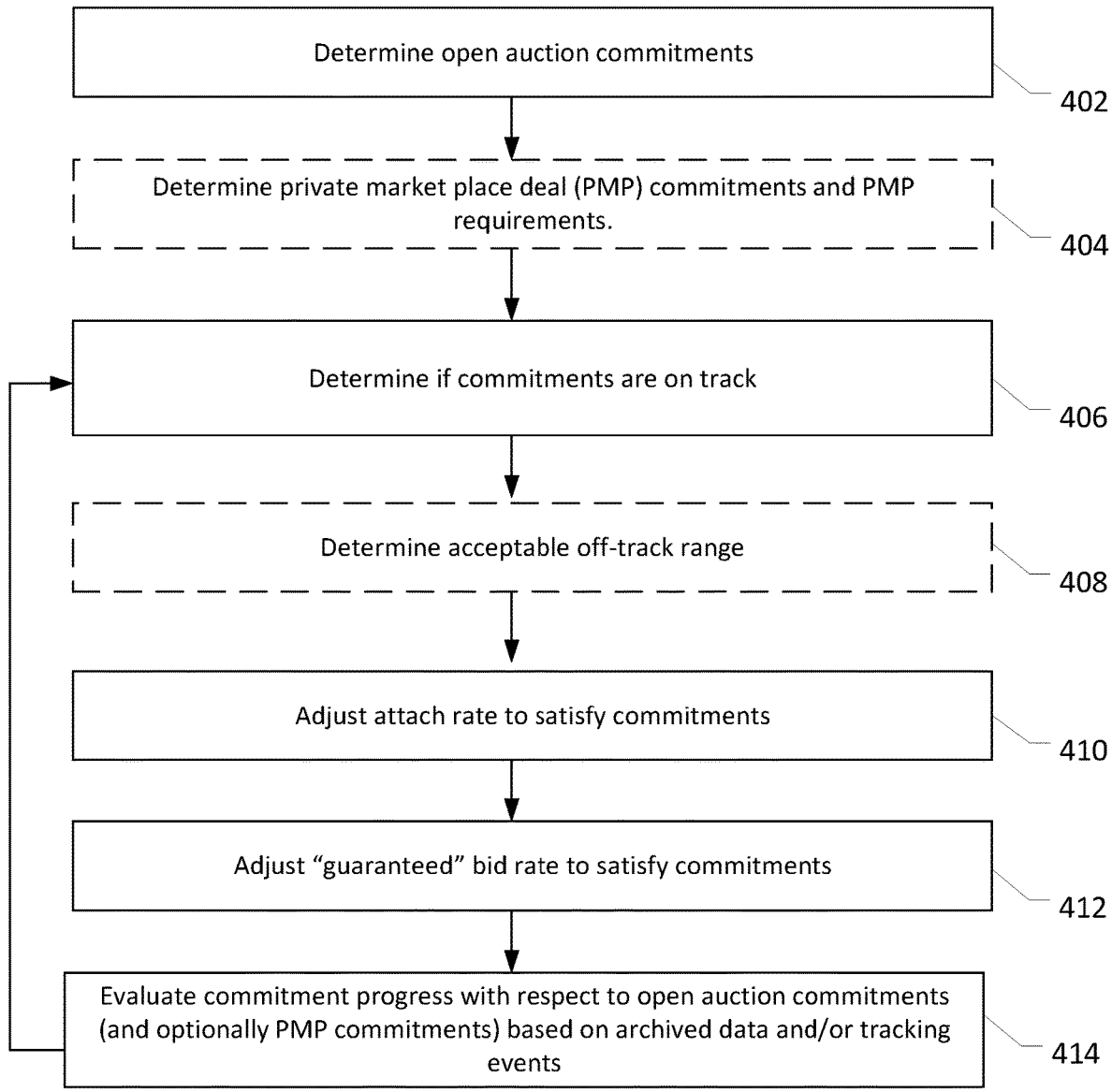
FIG. 4 is a schematic illustration of an example process for selecting advertisement bid types and adjusting a commitment policy, in accordance with one or more example embodiments of the present disclosure.

FIG. 4 depicts example process flow for attaching deal IDs to one or more slots corresponding to an advertisement bid request and for assigning key/value pairs corresponding to "guaranteed" line items. Some or all of the blocks of the process flows in this disclosure may be performed in a distributed manner across any number of devices (e.g., servers and computing devices). Some or are all of the operations of the process flow may be optional and may be performed in a different order.

At block 402, computer-executable instructions stored on a memory of a device, such as a server, may be executed to determine commitments with publishers that are related to open auction bids. At optional block 404, computer-executable instructions stored on a memory of a device, such as a server, may be executed to determine commitments with publishers that are related to PMP deals. The commitments may include a total number of impressions per period of time or opportunity, a total number of submissions per period of time or opportunities, a number of successful bids, and/or any well-known metric for tracking bids and/or ensuring that opportunities are filled at the specific rate.

At block 406, computer-executable instructions stored on a memory of a device, such as a server, may be executed to determine if commitments are on track. This determination may be made by determining archived data (e.g., the number of submissions of OA and/or PMP deals over a certain period of time and for a certain publisher) and comparing the archived data to the commitment goals with publishers. At optional block 408, an acceptable off-track range may be determined. For example, it may be determined that if the archived data indicates that the submissions of bids only differ +/−2% from the commitments, this is acceptable.

At block 410, computer-executable instructions stored on a memory of a device, such as a server, may be executed to adjust the attach rate to satisfy the commitments if it is determined that the submissions are off-track and/or outside of an acceptable off-track range. The attach rate may be the set number of slots that can be filled by PMP deals. This may be a percentage of slots. For example, if the attach rate is 50%, then an advertisement request with 6 slots would be assigned 3 PMP deals. It is understood that the attach rate may be adjusted between 0% and 100% to correct for submissions that are off-track from the commitments. It further is understood that by decreasing the attach rate, the OA and other non-deal type bid opportunities may increase and vice versa.

At block 412 computer-executable instructions stored on a memory of a device, such as a server, may be executed to increase the number or percentage of OA bids that are prioritized as guaranteed bids by assigning to those OA bids key/value pairs corresponding to "guaranteed" line items. This may be desirable where the commitments include a successful bid requirement (e.g., minimum). At block 414, the advertisement exchange system may reevaluate the progress with respect to the archived data and commitments and may reinitiate block 406 to determine if the commitments are on track.

Figure 5A:
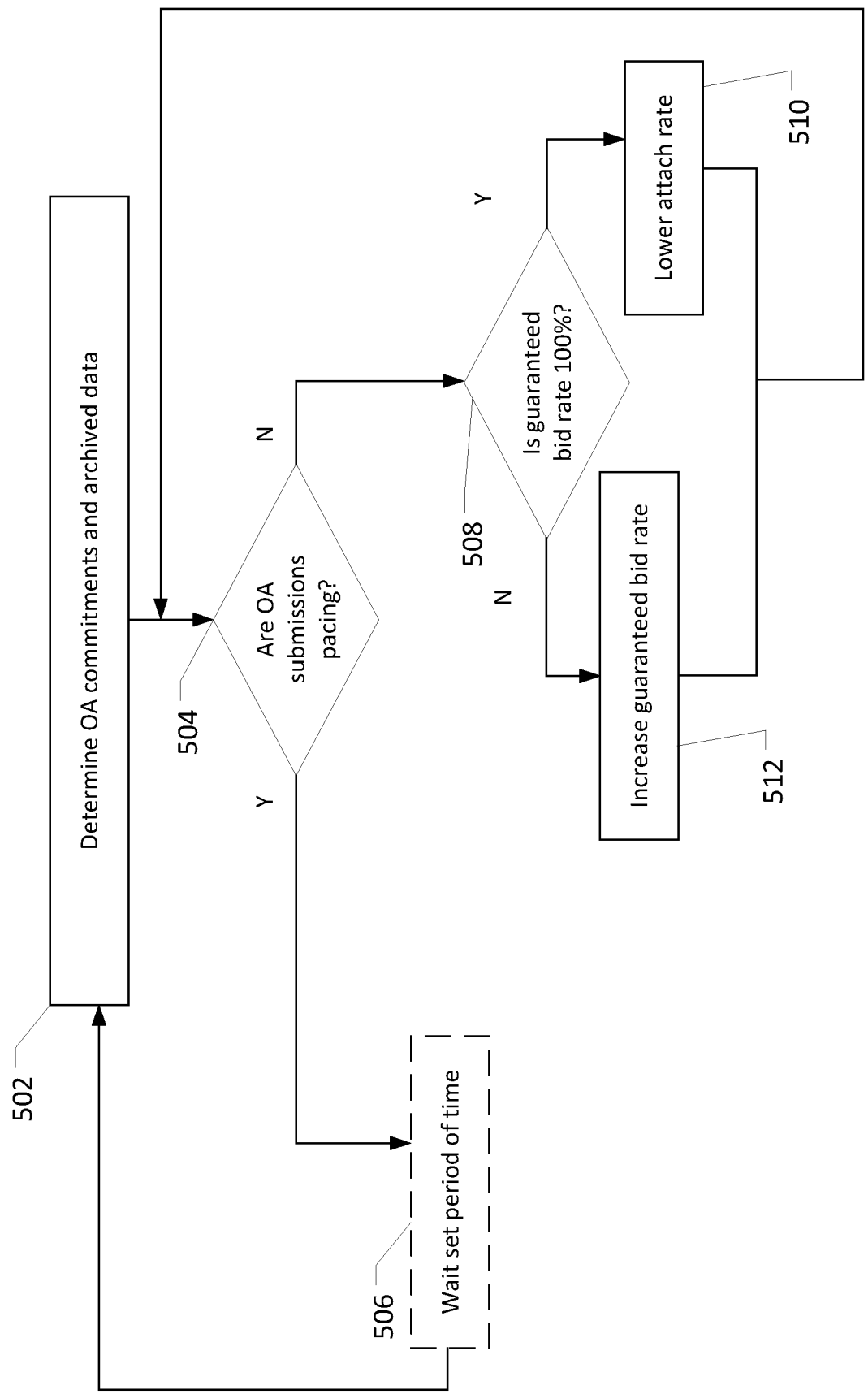
FIGS. 5A-5B. are schematic illustrations of example process flows for modifying a commitment policy to select types of advertisement bids, in accordance with one or more example embodiments of the present
Figure 5B:
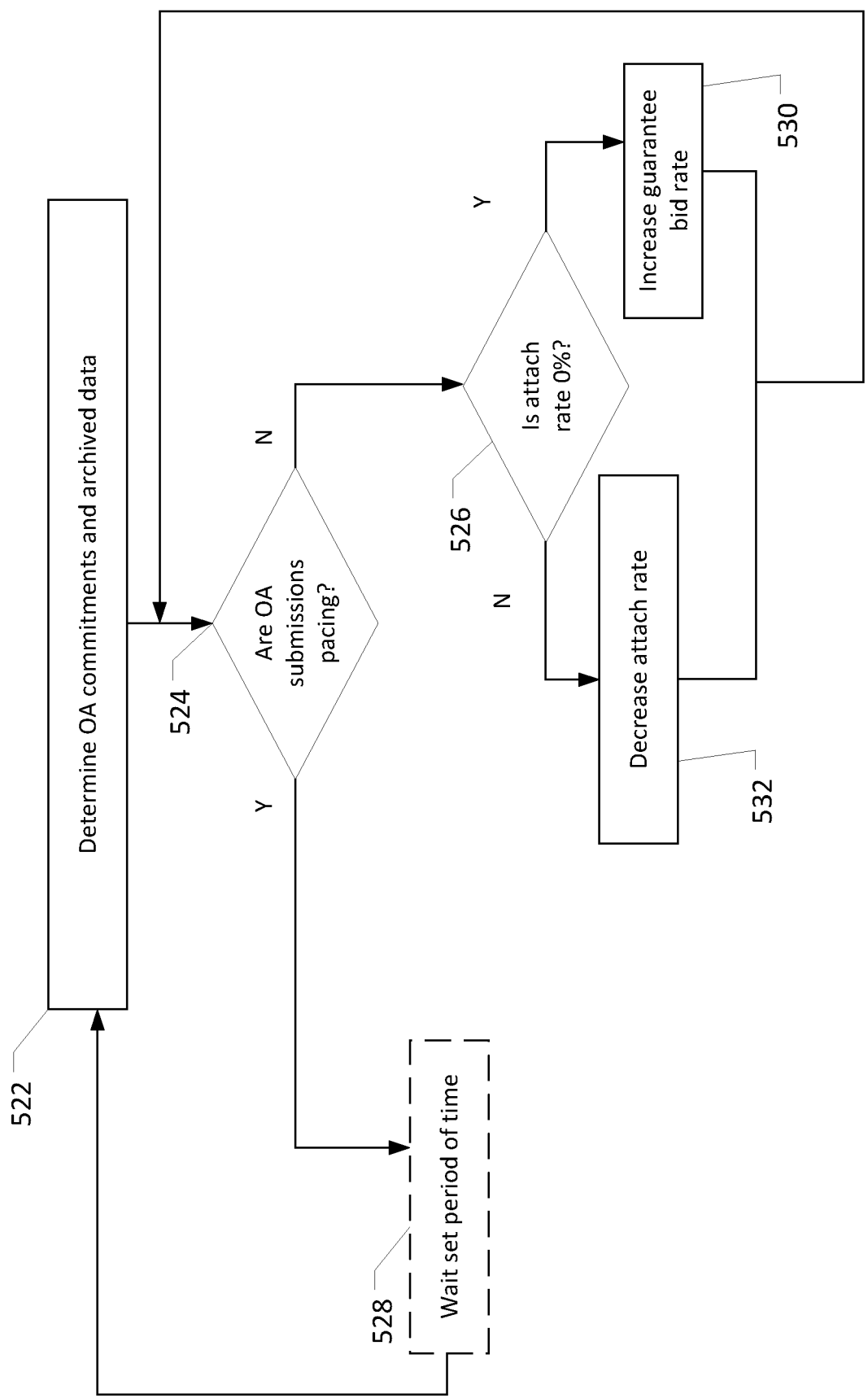

FIGS. 5A-5B depict exemplary process flows for adjusting a commitment policy to satisfy commitments with publishers. Some or all of the blocks of the process flows in these disclosures may be performed in a distributed manner across any number of devices (e.g., servers and computing devices). Some or are all of the operations of the process flows may be optional and may be performed in a different order.

Referring now to FIG. 5A, an exemplary process flow for increasing submissions of OA type bids and/or increasing the success of OA type bids is illustrated. At block 502, computer-executable instructions stored on a memory of a device, such as a server, may be executed to determine commitments with publishers that are related to open auction as well as archived data. At decision 504, computer-executable instructions stored on a memory of a device, such as a server, may be executed to determine whether the OA submissions are pacing with the OA commitments (e.g., on track). This may involve a pacing value based on archived data. The pacing value may be compared to a goal or metric to determine if the system is on track and/or pacing with the goal. As explained above, the system may consider an acceptable off-track discrepancy (e.g., +/−2%).

If the commitments are pacing, then at optional block 506, the computer-executable instructions stored on a memory of a device, such as a server, may be executed to wait a set period of time and then reinitiate step 502. If instead the commitments are not pacing (e.g., the submissions are off-track), then at decision 508, computer-executable instructions stored on a memory of a device, such as a server, may be executed to determine whether the guaranteed bid rate is 100%. A guaranteed bid rate of 100% would prioritize every OA bid by assigning key/value pairs corresponding to "guaranteed" line items.

If the guaranteed bid rate is 100%, then at block 510, the computer-executable instructions stored on a memory of a device, such as a server, may be executed to lower the attach rate. Alternatively, if the guaranteed bid rate is not 100%, then at block 512, the guaranteed bid rate will be increased (e.g., by increments of 5%, 10%, 20%, or any other increment). After either block 512 and block 510, decision 504 may be reinitiated. If the OA submissions are pacing, then at optional block 506 computer-executable instructions stored on a memory of a device, such as a server, may be executed to wait a set period of time before reinitiating block 502. Alternatively, if the OA submissions are not pacing, decision 508 may be reinitiated.

Referring now to FIG. 5B, an alternative exemplary process flow for increasing submissions of OA type bids and/or increasing the success of OA type bids is illustrated. At block 522, computer-executable instructions stored on a memory of a device, such as a server, may be executed to determine commitments with publishers that are related to open auction as well as archived data. At decision 524, computer-executable instructions stored on a memory of a device, such as a server, may be executed to determine whether the OA submissions are pacing with the OA commitments (e.g., on track). This may involve a pacing value based on archived data. The pacing value may be compared to a goal or metric to determine if the system is on track and/or pacing with the goal. As explained above, the system may consider an acceptable off-track discrepancy (e.g., +/−2%).

If the commitments are pacing, then at optional block 528, the computer-executable instructions stored on a memory of a device, such as a server, may be executed to wait a set period of time and then reinitiate step 522. If instead the OA submissions are not pacing (e.g., the submissions are off-track), then at decision 526 computer-executable instructions stored on a memory of a device, such as a server, may be executed to determine whether the attach rate is 0% (e.g., no deal bids are assigned to slots designated for deal bids). If the attach rate is 0%, then at block 530 computer-executable instructions stored on a memory of a device, such as a server, may be executed to increase the guaranteed bid rate. Alternatively, if the attach rate is not 0%, then at block 532 computer-executable instructions stored on a memory of a device, such as a server, may be executed to decrease the attach rate (e.g., by increments of 5%, 10%, 20%, or any other increment). After either block 532 and block 530, decision 524 may be reinitiated. If the OA submissions are pacing, then at optional block 528 computer-executable instructions stored on a memory of a device, such as a server, may be executed to wait a set period of time before reinitiating block 522. Alternatively, if the OA submissions are not pacing, decision 526 may be reinitiated.

It is understood that a similar strategy may be implemented to increase PMP deal submissions. It is further understood that the adjustor may examine if PMP deals are serving too large a percentage as compared to the commitments. If this is the case, the adjustor may select the strategy described above with respect to FIG. 5B to reduce the PMP deal attachment before adjusting the guaranteed bid rate. If this is not the case, the adjustor may select the strategy described above with respect to FIG. 5A. It is further understood that the adjustor may be responsible for determining which strategy to use and may reevaluate based on the results. In one example, if there is an insufficient data size in the archive to determine pacing, the adjustor may determine not to make any adjustments.

Illustrative Device Architecture

Figure 6:
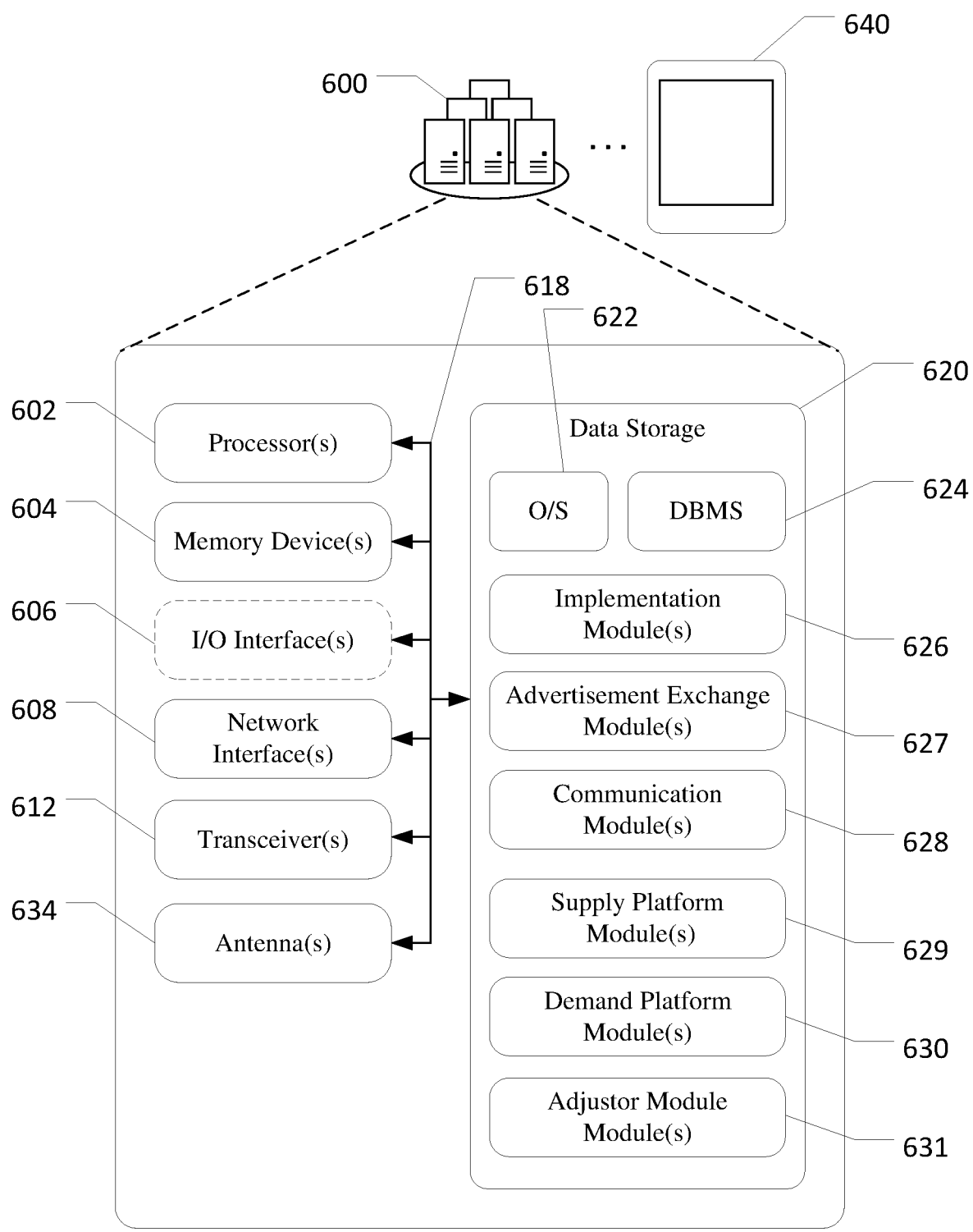
FIG. 6 is a schematic block diagram of a device in accordance with one or more example embodiments of the disclosure.

FIG. 6 is a schematic block diagram of an illustrative server 600 in accordance with one or more example embodiments of the disclosure. The server 600 may be one or more servers and may include any suitable computing device capable of receiving and/or sending data, and may optionally be coupled to devices including, but not limited to, electronic devices such as a connected device, smartphone, tablet, smart television, e-reader, one or more user devices (e.g., wearable devices and/or smart sensors), a desktop computer, a laptop computer, one or more servers, datastores, or the like. The server 600 may correspond to an illustrative device configuration for any servers of FIGS. 1-5B. Server 600 may be the same as server 125 and may run the advertising exchange system. Electronic device 640 may correspond to electronic device 110 and/or any other electronic device of FIGS. 1-5B.

The server 600 may be configured to communicate via one or more networks with one or more servers, electronic devices, user devices, or the like. Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the server 600 may include one or more processors (processor(s)) 602, one or more memory devices 604 (generically referred to herein as memory 604), one or more of the optional input/output (I/O) interface(s) 606, one or more network interface(s) 608, one or more transceivers 612, and one or more antenna(s) 634. The server 600 may further include one or more buses 618 that functionally couple various components of the server 600. The server 600 may further include one or more antenna(e) 634 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals including BLE signals, a Near Field Communication (NFC) antenna for transmitting or receiving NFC signals, a 900 MHz antenna, and so forth. These various components will be described in more detail hereinafter.

The bus(es) 618 may include at least one of a system bus, a memory bus, an address bus, or a message bus, and may permit exchange of information (e.g., data (including computer-executable code), signaling, etc.) between various components of the server 600. The bus(es) 618 may include, without limitation, a memory bus or a memory controller, a peripheral bus, an accelerated graphics port, and so forth. The bus(es) 618 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 604 of the server 600 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 604 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 604 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 620 may include removable storage and/or non-removable storage including, but not limited to, magnetic storage, optical disk storage, and/or tape storage. The data storage 620 may provide non-volatile storage of computer-executable instructions and other data. The memory 604 and the data storage 620, removable and/or non-removable, are examples of computer-readable storage media (CRSM) as that term is used herein.

The data storage 620 may store computer-executable code, instructions, or the like that may be loadable into the memory 604 and executable by the processor(s) 602 to cause the processor(s) 602 to perform or initiate various operations. The data storage 620 may additionally store data that may be copied to memory 604 for use by the processor(s) 602 during the execution of the computer-executable instructions. Moreover, output data generated as a result of execution of the computer-executable instructions by the processor(s) 602 may be stored initially in memory 604, and may ultimately be copied to data storage 620 for non-volatile storage.

More specifically, the data storage 620 may store one or more operating systems (O/S) 622; one or more database management systems (DBMS) 624; and one or more program module(s), applications, engines, computer-executable code, scripts, or the like such as, for example, one or more implementation module(s) 626, one or more advertisement exchange module(s) 627, one or more communication module(s) 628, one or more supply platform module(s) 629, one or more demand platform module(s) 630, and/or one or adjustor module(s) 631. Some or all of these module(s) may be sub-module(s). Sub or all of these module(s) may be part of the catalog service and some or all of these modules may be part of the system. Any of the components depicted as being stored in data storage 620 may include any combination of software, firmware, and/or hardware. The software and/or firmware may include computer-executable code, instructions, or the like that may be loaded into the memory 604 for execution by one or more of the processor(s) 602. Any of the components depicted as being stored in data storage 620 may support functionality described in reference to correspondingly named components earlier in this disclosure.

The data storage 620 may further store various types of data utilized by components of the server 600. Any data stored in the data storage 620 may be loaded into the memory 604 for use by the processor(s) 602 in executing computer-executable code. In addition, any data depicted as being stored in the data storage 620 may potentially be stored in one or more datastore(s) and may be accessed via the DBMS 624 and loaded in the memory 604 for use by the processor(s) 602 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 6, the datastore(s) may include, for example, user preference information, user contact data, device pairing information, and other information.

The processor(s) 602 may be configured to access the memory 604 and execute computer-executable instructions loaded therein. For example, the processor(s) 602 may be configured to execute computer-executable instructions of the various program module(s), applications, engines, or the like of the server 600 to cause or facilitate various operations to be performed in accordance with one or more embodiments of the disclosure. The processor(s) 602 may include any suitable processing unit capable of accepting data as input, processing the input data in accordance with stored computer-executable instructions, and generating output data. The processor(s) 602 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), an application-specific integrated circuit, a digital signal processor (DSP), and so forth. Further, the processor(s) 602 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 602 may be capable of supporting any of a variety of instruction sets.

Referring now to functionality supported by the various program module(s) depicted in FIG. 6, the implementation module(s) 626 may include computer-executable instructions, code, or the like that are responsive to execution by one or more of the processor(s) 602 may perform functions including, but not limited to, overseeing coordination and interaction between one or more modules and computer executable instructions in data storage 620. Implementation module 626 may further coordinate with communication module 628 to send messages to and receive messages from electronic device 110 and/or external advertisement exchange.

The advertisement exchange module(s) 627 may include computer-executable instructions, code, or the like that are responsive to execution by one or more of the processor(s) 602 may perform functions including, but not limited to, processing an advertisement request to determine slots and coordinating with the adjustor module to determine attach rate and guaranteed bid rate and otherwise assigning key/value pairs corresponding to "guaranteed" line items. The advertisement exchange module may further include and/or manage the commitments database and the archive data.

The communication module(s) 628 may include computer-executable instructions, code, or the like that responsive to execution by one or more of the processor(s) 602 may perform functions including, but not limited to, communicating with one or more devices or servers, for example, via wired or wireless communication, communicating with electronic devices, communicating with one or more servers (e.g., remote servers), communicating with remote datastores and/or databases, sending or receiving notifications or commands/directives, communicating with cache memory data, and the like.

The supply platform module(s) 629 may include computer-executable instructions, code, or the like that are responsive to execution by one or more of the processor(s) 602 may perform functions including, but not limited to, interfacing with publishers and/or suppliers. As explained above, in one example, the supply platform module 629 may sends advertisement bid requests and distribute tracking events.

The demand platform module(s) 630 may include computer-executable instructions, code, or the like that are responsive to execution by one or more of the processor(s) 602 may perform functions including, but not limited to, determining advertisements to assign to slots corresponding to an advertisement request. The demand platform module 630 may determine policies and/or rules corresponding to each slot and may determine advertisements that satisfy the policies and/or rules. The demand platform module 630 may prioritize advertisements based on commitments to advertisers. The advertising database, policies database and pacing engine may be part of the demand platform module 630.

The adjustor module(s) 631 may include computer-executable instructions, code, or the like that are responsive to execution by one or more of the processor(s) 602 may perform functions including, but not limited to, determining commitment policies based on commitments in the commitment database and archived data. The adjustor may periodically update the commitment policies based on updated information (e.g., advertisement submission information) from the archive and/or tracking events.

Referring now to other illustrative components depicted as being stored in the data storage 620, the O/S 622 may be loaded from the data storage 620 into the memory 604 and may provide an interface between other application software executing on the server 600 and hardware resources of the server 600. More specifically, the O/S 622 may include a set of computer-executable instructions for managing hardware resources of the server 600 and for providing common services to other application programs (e.g., managing memory allocation among various application programs). In certain example embodiments, the O/S 622 may control execution of the other program module(s) for content rendering. The O/S 622 may include any operating system now known or which may be developed in the future including, but not limited to, any server operating system, any mainframe operating system, or any other proprietary or non-proprietary operating system.

The DBMS 624 may be loaded into the memory 604 and may support functionality for accessing, retrieving, storing, and/or manipulating data stored in the memory 604 and/or data stored in the data storage 620. The DBMS 624 may use any of a variety of database models (e.g., relational model, object model, etc.) and may support any of a variety of query languages. The DBMS 624 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like.

Referring now to other illustrative components of the server 600, the optional input/output (I/O) interface(s) 606 may facilitate the receipt of input information by the server 600 from one or more I/O devices as well as the output of information from the server 600 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the server 600 or may be separate. The I/O devices may further include, for example, any number of peripheral devices such as data storage devices, printing devices, and so forth.

The optional I/O interface(s) 606 may also include an interface for an external peripheral device connection such as universal serial bus (USB), FireWire, Thunderbolt, Ethernet port or other connection protocol that may connect to one or more networks. The optional I/O interface(s) 606 may also include a connection to one or more of the antenna(e) 634 to connect to one or more networks via a wireless local area network (WLAN) (such as Wi-Fi®) radio, Bluetooth, ZigBee, and/or a wireless network radio, such as a radio capable of communication with a wireless communication network such as a Long Term Evolution (LTE) network, WiMAX network, 3G network, ZigBee network, etc.

The server 600 may further include one or more network interface(s) 608 via which the server 600 may communicate with any of a variety of other systems, platforms, networks, devices, and so forth. The network interface(s) 608 may enable communication, for example, with one or more wireless routers, one or more host servers, one or more web servers, and the like via one or more of networks.

The antenna(e) 634 may include any suitable type of antenna depending, for example, on the communications protocols used to transmit or receive signals via the antenna (e) 634. Non-limiting examples of suitable antennas may include directional antennas, non-directional antennas, dipole antennas, folded dipole antennas, patch antennas, multiple-input multiple-output (MIMO) antennas, or the like. The antenna(e) 634 may be communicatively coupled to one or more transceivers 612 or radio components to which or from which signals may be transmitted or received.

As previously described, the antenna(e) 634 may include a Bluetooth antenna configured to transmit or receive signals in accordance with established standards and protocols, such as Bluetooth and/or BLE. Alternatively, or in addition to, antenna(e) 634 may include cellular antenna configured to transmit or receive signals in accordance with established standards and protocols, such as or cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like. The antenna(e) 634 may additionally, or alternatively, include a Wi-Fi® antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 634 may be configured to transmit or receive radio frequency signals within any suitable frequency range forming part of the unlicensed portion of the radio spectrum (e.g., 900 MHz).

The antenna(e) 634 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 612 may include any suitable radio component(s) for—in cooperation with the antenna(e) 634—transmitting or receiving radio frequency (RF) signals in the bandwidth and/or channels corresponding to the communications protocols utilized by the server 600 to communicate with other devices. The transceiver(s) 612 may include hardware, software, and/or firmware for modulating, transmitting, or receiving—potentially in cooperation with any of antenna(e) 634—communications signals according to any of the communications protocols discussed above including, but not limited to, one or more Wi-Fi® and/or Wi-Fi® direct protocols, as standardized by the IEEE 802.11 standards, one or more non-Wi-Fi® protocols, or one or more cellular communications protocols or standards. The transceiver(s) 612 may further include hardware, firmware, or software for receiving GNSS signals. The transceiver(s) 612 may include any known receiver and baseband suitable for communicating via the communications protocols utilized by the server 600. The transceiver(s) 612 may further include a low noise amplifier (LNA), additional signal amplifiers, an analog-to-digital (A/D) converter, one or more buffers, a digital baseband, or the like.

It should be appreciated that the program module(s), applications, computer-executable instructions, code, or the like depicted in FIG. 6 as being stored in the data storage 620 are merely illustrative and not exhaustive and that processing described as being supported by any particular module may alternatively be distributed across multiple module(s)

or performed by a different module. In addition, various program module(s), script(s), plug-in(s), Application Programming Interface(s) (API(s)), or any other suitable computer-executable code hosted locally on the server 600 and/or hosted on other computing device(s) accessible via one or more networks, may be provided to support functionality provided by the program module(s), applications, or computer-executable code depicted in FIG. 6 and/or additional or alternate functionality. Further, functionality may be modularized differently such that processing described as being supported collectively by the collection of program module(s) depicted in FIG. 6 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 6 may be implemented, at least partially, in hardware and/or firmware across any number of devices.

It should further be appreciated that the server 600 may include alternate and/or additional hardware, software, or firmware components beyond those described or depicted without departing from the scope of the disclosure. More particularly, it should be appreciated that software, firmware, or hardware components depicted as forming part of the server 600 are merely illustrative and that some components may not be present or additional components may be provided in various embodiments. While various illustrative program module(s) have been depicted and described as software module(s) stored in data storage 620, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A computer-implemented method comprising:
   determining, by one or more processor, an advertisement request corresponding to a first slot and a second slot;
   determining, by the one or more processor, that the first slot and second slot correspond to a deal type bid;
   determining, by the one or more processor, contextual rules corresponding to the advertisement request;
   determining, by the one or more processor, a commitment policy, the commitment policy including a goal corresponding to a threshold number of submissions of open auction type bids;
   determining, by the one or more processor, a first value indicative of progress towards the commitment goal, wherein the first value is one of a number of impressions, a number of submissions, or a number of successful bids;
   determining, by the one or more processor, based on the commitment policy and the first value, not to attach a deal identifier to the first slot;
   determining, by the one or more processor, a first bid identifier for the first slot, the first bid identifier corresponding to the open auction type bid and satisfying the contextual rules;
   determining, by the one or more processor, a second bid identifier for the second slot, the second bid identifier corresponding to the deal type bid and satisfying the contextual rules;
   determining, by the one or more processor, based on the commitment policy, to prioritize the first bid identifier;
   sending, by the one or more processor, a submission of the first bid identifier for the first slot and the second bid identifier for the second slot to an auction for the first slot and the second slot;
   comparing, by the one or more processor, an aggregate number of open auction type bid submissions based on the first bid identifier to the threshold number; and
   dynamically adjusting, by the one or more processor, the commitment policy stored in memory based on the aggregate number and the threshold number.

2. The computer-implemented method of claim 1, further comprising:
   adjusting the commitment policy to set a guaranteed bid rate to 100%;
   determining that the guaranteed bid rate is set to 100%; and
   reducing an attach rate.

3. The computer-implemented method of claim 1, further comprising:
   adjusting the commitment policy to set an attach rate to 0%;
   determining that the attach rate is set to 0%; and
   increasing a guaranteed bid rate.

4. The computer-implemented method of claim 1, further comprising:
   determining tracking events indicative of the result of the first bid identifier and the second bid identifier at the auction; and
   adjusting the commitment policy based on the tracking events.

5. A computer-implemented method comprising:
   Determining, by one or more processor, an advertisement request corresponding to a first slot and a second slot, the advertisement request including a first rule; the first slot and the second slot corresponding to a first bid type;
   Determining, by the one or more processor, a first value indicative of progress towards a commitment goal for a second bid type, wherein the value is representative of progress towards the commitment goal, wherein the first value is one of a number of impressions, a number of submissions, or a number of successful bids;
   determining, by the one or more processor, a commitment policy associated with the second bid type;
   determining, by the one or more processor,, based on the commitment policy and the first value, to attach a deal identifier to the first slot designating the first slot for the second bid type;
   determining, by the one or more processor, a first bid identifier corresponding to a first advertisement for the first slot, the first bid identifier satisfying the first rule and corresponding to the second bid type;
   determining, by the one or more processor, a second bid identifier corresponding to a second advertisement for the second slot, the second bid identifier satisfying the first rule and corresponding to the first bid type,
   wherein the second bid type is deal type bid associated with the commitment policy and the first bid type is an open auction type bid; and
   dynamically adjusting, by the one or more processor, the commitment policy stored in a memory to achieve the commitment goal.

6. The computer-implemented method of claim 5, further comprising:
sending the first bid identifier and the second bid identifier to an auction for the first slot and the second slot;
determining a pacing value for the second bid type, the pacing value based on the first bid identifier; and
comparing the pacing value to the first value.

7. The computer-implemented method of claim 6, further comprising:
determining the pacing value does not satisfy the first value;
wherein adjusting the commitment policy further includes_adjusting the commitment policy to increase the pacing value.

8. The computer-implemented method of claim 5, wherein adjusting the commitment policy further includes:
adjusting the commitment policy to set a guaranteed bid rate to 100%; and
adjusting the commitment policy to reduce an attach rate based on the guaranteed bid rate being set to 100%.

9. The computer-implemented method of claim 5, wherein adjusting the commitment policy further includes:
adjusting the commitment policy to set an attach rate to 0%; and
adjusting the commitment policy to increase a guaranteed bid rate based on the attach rate being set to 0%.

10. The computer-implemented method of claim 5, wherein the first value corresponds to a certain percentage of total impressions for the second bid type.

11. computer-implemented The method of claim 5, further comprising:
determining to associate the first advertisement with a guaranteed line item.

12. The computer-implemented method of claim 5, further comprising:
determining tracking events indicative of the result of the first bid identifier and the second bid identifier at the auction; and
wherein adjusting the commitment policy further includes adjusting the commitment policy based on the tracking events.

13. A system comprising:
memory configured to store computer-executable instructions, and
at least one computer processor configured to access memory and execute the computer-executable instructions to:
determine an advertisement request corresponding to a first slot and a second slot, the advertisement request including a first rule; the first slot and the second slot corresponding to a first bid type;
determine a first value indicative of progress towards a commitment goal for a second bid type, wherein the first value is one of a number of impressions, a number of submissions, or a number of successful bids;
determine a commitment policy associated with the second bid type;
determine, based on the commitment policy and first value, to attach a deal identifier to the first slot designating the first slot for the second bid type;
determine a first bid identifier corresponding to a first advertisement for the first slot, the first bid identifier satisfying the first rule and corresponding to the second bid type;
determine a second bid identifier corresponding to a second advertisement for the second slot, the second bid identifier satisfying the first rule and corresponding to the first bid type,
wherein the second bid type is deal type bid associated with the commitment policy and the first bid type is an open auction type bid; and
dynamically adjusting the commitment policy stored in a memory to achieve the commitment goal.

14. The system of claim 13, wherein the at least one computer processor is further configured to access memory and execute the computer-executable instructions to:
send the first bid identifier and the second bid identifier to an auction for the first slot and the second slot;
determine a pacing value for the second bid type, the pacing value based on the first bid identifier; and
compare the pacing value to the first value.

15. The system of claim 14, wherein at the least one computer processor is further configured to access memory and execute the computer-executable instructions to:
determine the pacing value does not satisfy the first value; and
wherein to adjust the commitment policy further includes to access memory and execute the computer-executable instructions to adjust the commitment policy to increase the pacing value.

16. The system of claim 13, wherein to adjust the commitment policy further includes the at least one computer processor bring further configured to access memory and execute the computer-executable instructions to:
adjust the commitment policy to set a guaranteed bid rate to 100%; and
adjust the commitment policy to reduce an attach rate based on the guaranteed bid rate being set to 100%.

17. The system of claim 13, wherein to adjust the commitment policy further includes the at least one computer processor bring further configured to access memory and execute the computer-executable instructions to:
adjust the commitment policy to set an attach rate to 0%; and
adjust the commitment policy to increase a guaranteed bid rate based on the attach rate being set to 0%.

18. The system of claim 13, wherein the first value corresponds to a certain percentage of total impressions for the second bid type.

19. The system of claim 13, further comprising, and wherein the at least one computer processor is further configured to access memory and execute the computer-executable instructions to:
determine to associate the first advertisement with a guaranteed line item.

20. The system of claim 13, wherein the at least one computer processor is further configured to access memory and execute the computer-executable instructions to:
determine tracking events indicative of the result of the first bid identifier and the second bid identifier at the auction; and
wherein to adjust the commitment policy further includes to access memory and execute the computer-executable instructions to adjust the commitment policy based on the tracking events.

* * * * *

UNITED STATES PATENT AND TRADEMARK OFFICE
CERTIFICATE OF CORRECTION

PATENT NO. : 11,790,405 B1
APPLICATION NO. : 17/116766
DATED : October 17, 2023
INVENTOR(S) : Andrew Christopher Chud It is certified that error appears in the above-identified patent and that said Letters Patent is hereby corrected as shown below:

In the Claims

Claim 11 at Column 23, Line 30 should read:
--The computer-implemented method of claim 5, further--.

Signed and Sealed this
Twenty-first Day of November, 2023

Katherine Kelly Vidal
*Director of the United States Patent and Trademark Office*